United States Patent [19]
Criswell

[11] 3,716,072
[45] Feb. 13, 1973

[54] PRESSURE EQUALIZING VALVE
[76] Inventor: Dick M. Criswell, 529 Barbee Way, Danville, Ky.
[22] Filed: May 24, 1971
[21] Appl. No.: 146,185

[52] U.S. Cl. ............... 137/510, 137/525, 137/541, 137/544
[51] Int. Cl. ............................................. F16k 31/12
[58] Field of Search...137/509, 525, 525.5, 535, 541, 137/510, 544

[56] References Cited

UNITED STATES PATENTS

| 886,834 | 5/1908 | Michelin | 137/525 X |
|---|---|---|---|
| 1,476,383 | 12/1923 | Twardowsky | 137/525 |
| 2,270,333 | 1/1942 | Osborn | 137/525 |
| 2,896,381 | 7/1959 | Lange | 137/525 X |
| 3,179,122 | 4/1965 | Wasdell | 137/541 X |
| 3,196,924 | 7/1965 | Kaminga | 137/525 X |
| 3,417,768 | 12/1968 | Wasson | 137/525 X |

FOREIGN PATENTS OR APPLICATIONS

| 67,179 | 2/1892 | Germany | 137/510 |
|---|---|---|---|

Primary Examiner—Martin P. Schwadron
Assistant Examiner—David J. Zobkiw
Attorney—Woodard, Weikart, Emhardt & Naughton

[57] ABSTRACT

Disclosed is an assembly, including a filter and pressure equalizing valve, for relieving the interior of a burial casket of moisture and odor. The valve utilizes a thin, resilient disc or wafer, preferably formed of polyethylene, which is flexed into a substantially concavo-convex configuration to unseal an outlet port when a relatively small pressure differential (of the order of one-half inch water column) exists on the opposite sides of the disc.

5 Claims, 3 Drawing Figures

PATENTED FEB 13 1973

3,716,072

INVENTOR
Dick M. Criswell

BY
Woodard, Weikart, Emhardt & Naughton
ATTORNEYS 3,716,072

PRESSURE EQUALIZING VALVE

BACKGROUND OF THE INVENTION

Because events sometimes interrupt the normal time sequence in embalming and burial (delayed burial, for example), it is necessary to relieve the pressure within a casket by venting it to atmosphere. It is desireable to maintain the casket sealed until the pressure differential reaches a predetermined value before venting takes place, hence a simple vent aperture is unsatisfactory. An assembly which incorporates a valve biased to closed position must also, for this purpose, include an odor and vapor filtering component.

The concept of the present invention is embodied in a unitary assembly including a filter component and a normally closed valve, of simple, trouble-free construction, which moves to open position when only a relatively small pressure differential exists across it. The valve is conveniently calibrated upon assembly and complete filter and valve unit can be easily and quickly installed in a casket by mechanically unskilled persons at the time that the funeral director determines that the filter and venting function are necessary for a particular burial.

DESCRIPTION OF THE PREFERRED EMBODIMENT

Figure 1:
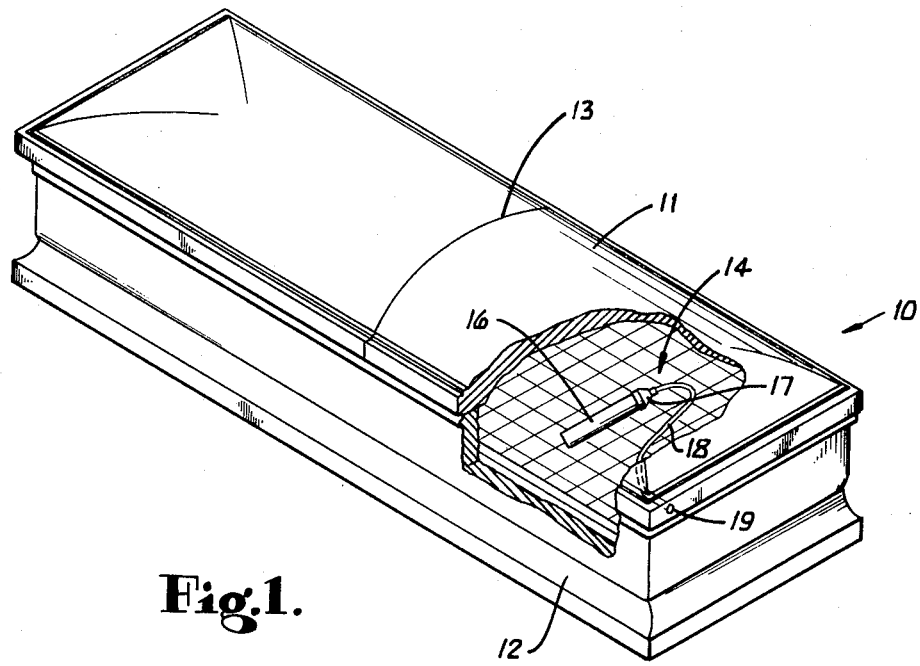
FIG. 1 is a perspective view of a conventional burial casket with portions broken away to illustrate the apparatus of the present invention installed in the casket.

Referring initially to FIG. 1 there is shown at 10 a conventional burial casket having a top portion 11 hinged to a base portion 12 and with a transverse division 13 which permits opening of the cap portion of the casket. Such caskets are normally provided with seals along the junction of the hinged upper portion and the lower base portion and sealed across the transverse dividing line 13.

The structure embodying the present invention, indicated generally at 14 in FIG. 1, is deposited at a convenient place within the casket and the filter element 16 and valve component 17 communicate by means of the flexible tube 18 with a fitting 19 mounted in the side of the casket at any inconspicuous location. The fitting 19 is shown in detail in FIG. 3 and is installed in the casket wall and provided with a threaded cap (not shown) at its outer end, the inner end being adapted to extend into and accommodate the end of the tube 18. It will be understood that a means other than the capped fitting 19 might be utilized for providing communication of the interior of the tube 18 with atmosphere, however, the use of the fitting as described, with the cap removed in the case of those caskets in which the apparatus of the present invention is to be utilized has proven to be satisfactory.

Figure 2:
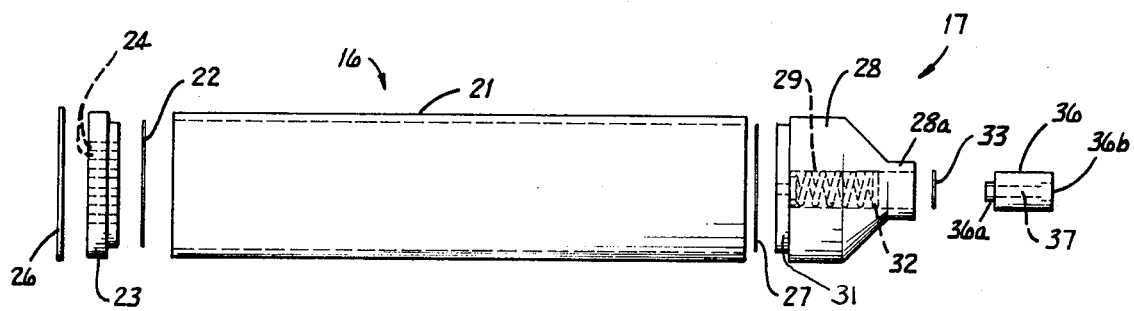
FIG. 2 is an exploded, side view of the filter and valve components of the structure.

Referring to FIG. 2, the filter element 16 takes the form of a polyvinyl chloride tube 21 which is filled with a suitable, conventional charcoal filter material. The end of the tube 21 receives a disc of filter paper 22 and superimposed on the disc 22 is a cap member 23 having a series of closely spaced apertures 24 through the cap. The closure 23 is rigidly fastened to the end of the tube by any suitable adhesive and, until the assembly is placed in use, a sealing disc of paper 26 is attached to the end of the closure 23 sealing the apertures 24, the paper disc being attached to the closure by a non-drying adhesive so that it can be easily removed when the assembly is placed in use.

The opposite end of the housing 21 also receives a disc of filter paper 27 and this end of the housing is closed by the valve body 28 which forms a part of the valve component indicated generally at 17. The valve body 28 is provided with a central bore 29 which extends with reduced diameter to form a shoulder portion 31, this shoulder portion extending slightly within the tubular housing 21 and being rigidly attached to the housing by any suitable adhesive means. A resilient means, taking the form of a coiled compression spring 32, is accommodated within the bore 29, the spring 32 having a relatively low force-deflection ratio. Accommodated with the extending end of the body 28 is a thin, flat, resilient element which may take the form of the polyethylene disc 33 having a thickness of the order of 0.003 inches. A plug 36 having a central passage or bore 37 through it is accommodated within the reduced end portion 28a of the valve body 28. When in place within the valve body, the portion 36a, having a reduced diameter, bears against the resilient disc 33 with the spring 32, engaging the peripheral area of the disc 33, serving to urge the central portion of the disc against the portion 36a of the plug to seal or obstruct the central passage 37. The outer end 36b of the plug may be adapted to accommodate the tube 18.

Figure 3:
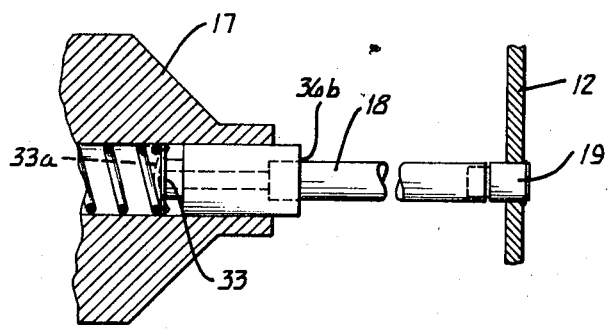
FIG. 3 is an enlarged, fragmentary, side-sectional view of the valve component shown in FIG. 2.

In assembling the plug 36 to the valve body 28, the disc 33 is positioned within the valve body and the plug 36 is inserted into the bore 29. During this assembly, a pressure equal to the pressure at which it is desired to have the valve open is established within the bore 29. Thus, as the plugs 36 are inserted into the bore 29 the disc 33 will be moved leftwardly (as viewed in FIG. 2) and energy will be stored in the slightly compressed spring 32 until the force exerted by the spring on the disc 33 is sufficient to cause it to move to a concavo-convex position, such as indicated at 33a in FIG. 3, thereby unsealing the passage 37 through the plug. When this depth of insertion of the plug 36 within the bore 29 is reached, the plug 36 is permanently adhered to the valve body 28 and the assembly and calibration of the valve is complete since the existence of the predetermined pressure in the passage 29 will just be sufficient, with the aid of spring 32, to distort the disc 33 into its concavo-convex position shown in broken lines in FIG. 3 to open the valve. The pressure differential for this type of application is relatively low and may be of the order of one-half inch of water column. As indicated in FIG. 3 and previously mentioned, completion of the assembly requires fastening of the tube 18 to the outlet end 36b of the plug 36. When the assembly is to be utilized with any casket, the valve and filter component are placed within the casket as shown in FIG. 1 and the end of the tube 18 is attached to the fitting 19 and the cap (not shown) on the fitting 19 is removed. The interior of the casket remains sealed because the disc 33 obstructs the passage 37 in the plug 36, however, should the pressure within the casket rise above the calibrated value, the disc 33 will distort to its concavo-convex configuration permitting reduction of pressure in the casket through the tube 18 until the pressure is equalized with atmospheric pressure. It will be noted that the valve assembly also functions to prevent the entry of air into the casket from the exterior, that is, the sealed condition of the casket is not altered as long as the pressure in the casket does not exceed the calibrated amount.

I claim:

1. A low pressure-differential actuated valve assembly comprising a valve body having a central bore therethrough with one end of said bore serving as an inlet passage for said valve assembly, a plug inserted to a selective depth within said bore, said plug having a central bore coaxial with and communicating with said body bore and adapted at its outer end to function as an outlet for said valve assembly, the inner end portion of said plug being of reduced diameter, a thin flat resilient element disposed within said central bore in said body, and means resiliently urging said element against the reduced end of said plug to obstruct the central bore therethrough, said element assuming a substantially concavo-convex configuration upon the existence of a predetermined pressure differential between said valve assembly inlet and outlet to thereby open communication therebetween.

2. A valve assembly as claimed in claim 1 in which said resilient element takes the form of a disc and said resilient means takes the form of a coiled compression spring engaging said disc adjacent its outer margin and the central portion of said disc, when unflexed closes the reduced diameter inner end of said plug.

3. A valve assembly as claimed in claim 2 in which said disc is formed of polyethylene and has a thickness of the order of 0.003 inches.

4. A valve assembly as claimed in claim 1 in which the depth of insertion of said plug into said body bore determines the energy stored in said resilient means and hence the pressure differential at which said resilient element assumes its substantially concavo-convex configuration and opens communication between said valve inlet and outlet.

5. A filter and venting valve assembly for use with burial caskets comprising a tubular housing apertured at one end providing an intake and containing a filter medium for filtering the gases passing axially through the housing, the end of said housing remote from the intake end having attached thereto a valve body, said valve body having a central bore therethrough with one end of said bore serving as an inlet passage for said valve body, a plug inserted to a selective depth within said bore, said plug having a central bore coaxial with and communicating with said body bore and adapted at its outer end to function as an outlet for said filter and venting valve assembly, the inner end portion of said plug being of reduced diameter, a thin flat resilient element disposed within said central bore in said body, and means resiliently urging said element against the reduced end of said plug to obstruct the central bore therethrough, said element assuming a substantially concavo-convex configuration upon the existence of a predetermined pressure differential between said valve body inlet and valve assembly outlet to thereby open communication therebetween.

* * * * *